Feb. 12, 1935.　　G. H. MORGENSTERN　　1,990,837
EXHAUSTER FOR INTERNAL COMBUSTION ENGINES
Filed March 16, 1931　　3 Sheets-Sheet 1
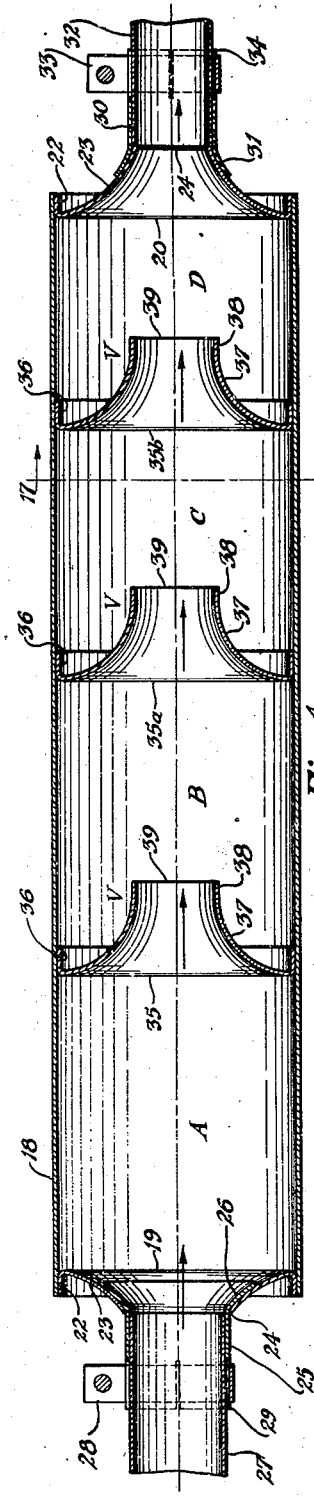
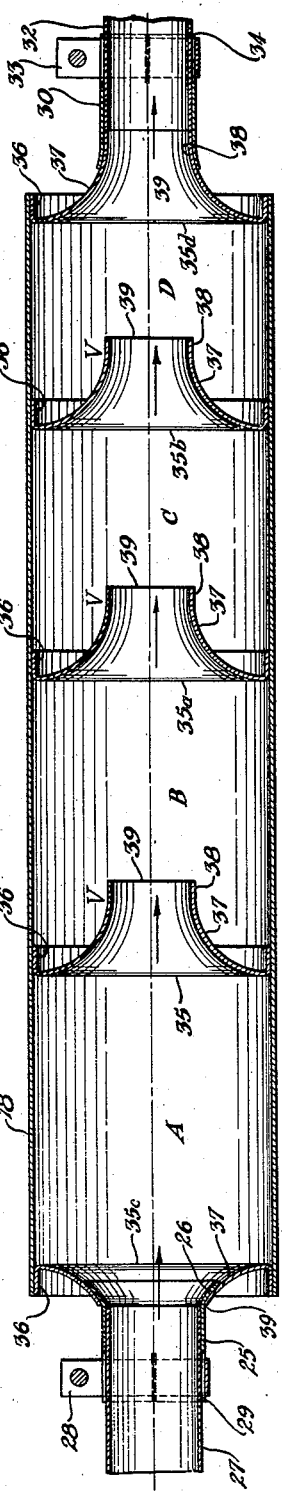
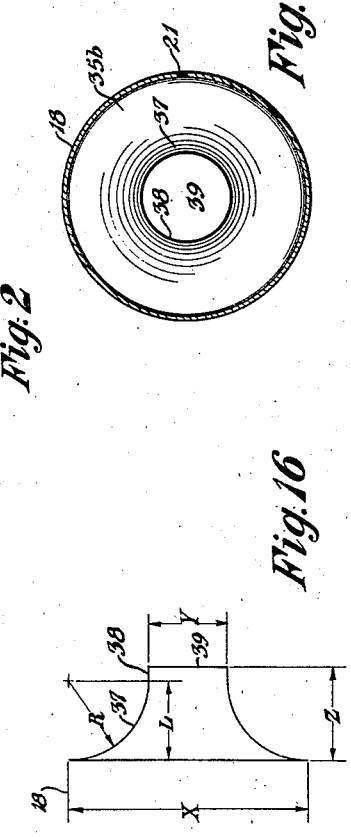
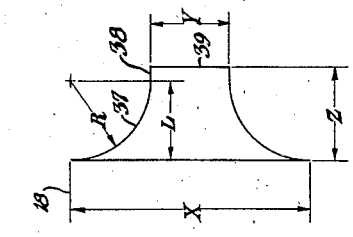
Inventor
G. H. Morgenstern
By Frease and Bishop
Attorneys

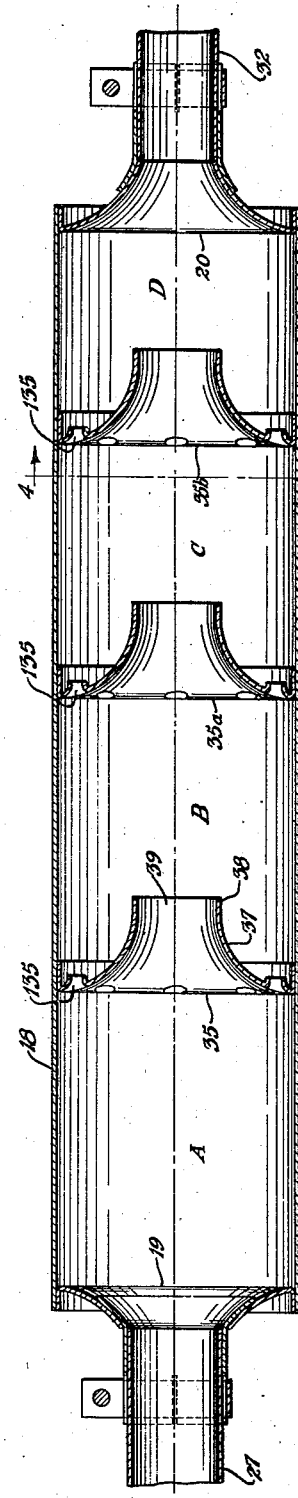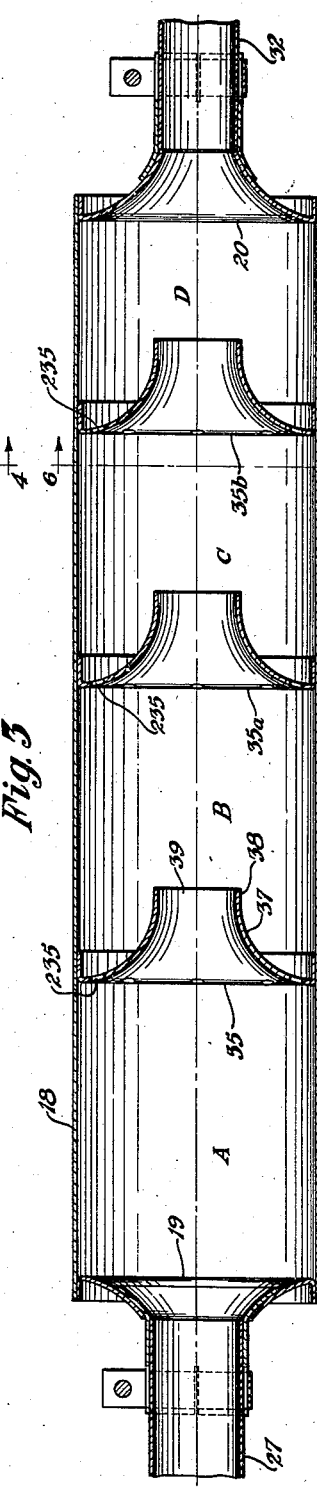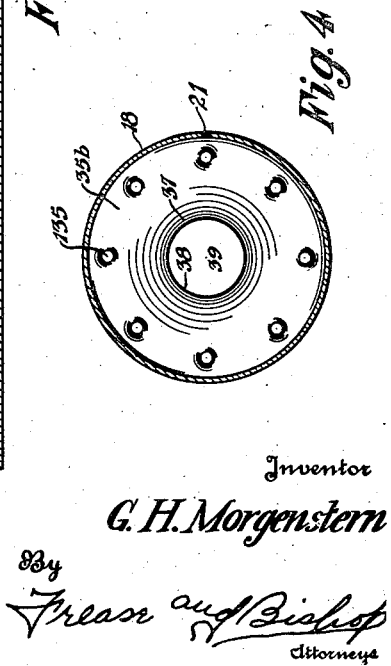

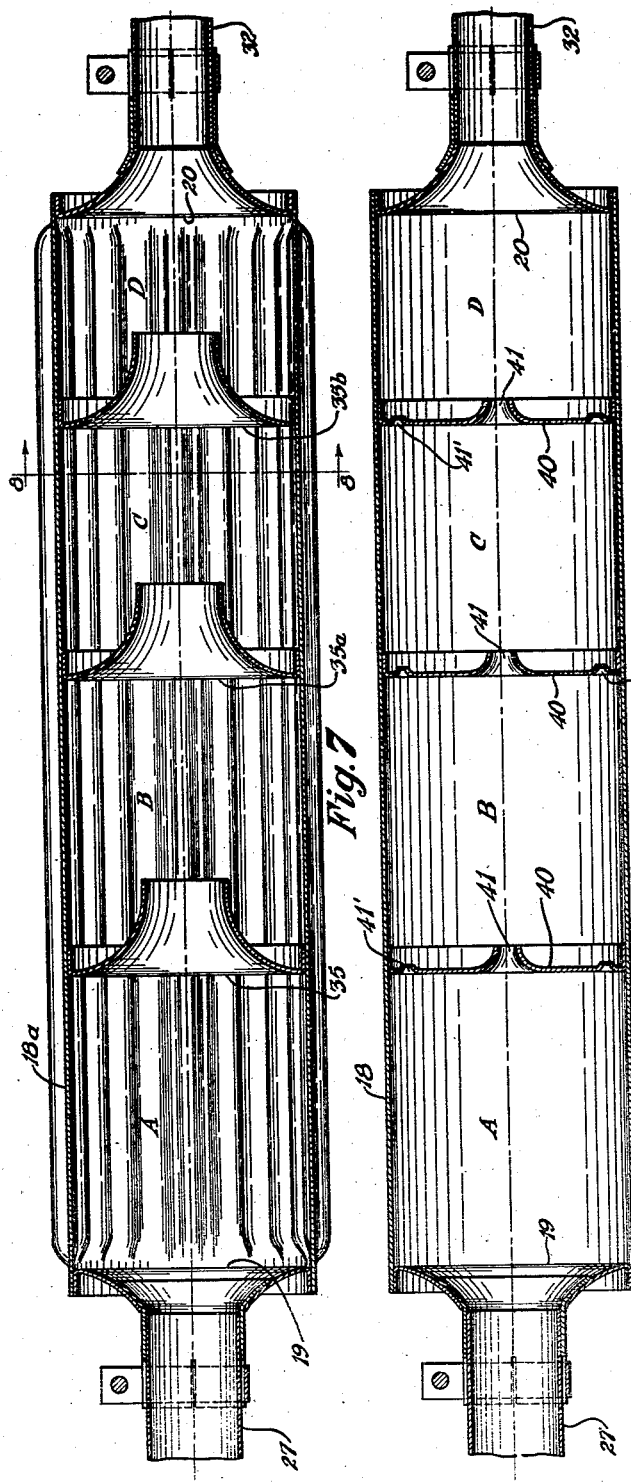

Patented Feb. 12, 1935

1,990,837

UNITED STATES PATENT OFFICE 1,990,837

EXHAUSTER FOR INTERNAL COMBUSTION ENGINES

George H. Morgenstern, Detroit, Mich.

Application March 16, 1931, Serial No. 522,803

2 Claims. (Cl. 137—160)

The invention relates to an exhauster construction connected in the exhaust duct system of an internal combustion engine, not only for muffling the noises created by the rapid successive release of exhaust gases under pressure from the engine cylinders, but also for pulling out, drawing away or otherwise positively exhausting the burned, spent or dead exhaust gases from internal combustion engines.

Motor vehicles are in most places required by law to be equipped with mufflers to modulate the noises resulting from the successive explosions occurring in their cylinders, and to silence the same to a degree which will not be obnoxious to the general public.

Without muffling, these noises arise from the sudden release at relatively high pressures directly to the atmosphere of a successive series of relatively large volumes of exhaust gases at high temperatures from the engine cylinders, which expand substantially instantaneously and produce reports similar to a series of gun shots.

The universal impression is that a muffler plays a minor or unimportant part in internal combustion engine operation, so that as long as a muffler functions within the requirements of the law, it is considered satisfactory by the manufacturer and by the general public.

The prior practice of muffler construction has therefore been to confine the hot gases exhausted from the cylinders in a container until their volume has been reduced by cooling, and/or until the gases have expanded to nearly atmospheric pressure, so that the ultimate release thereof to the atmosphere in a substantially constant stream will be noiseless.

The confinement and retention of the hot gases within a muffler has been accomplished in most instances in the past by causing the same to be subjected to a large number of changes in direction of flow within the muffler and by breaking up the stream of hot exhaust gases passing therethrough into a large number of small streams which are led through tortuous passages therein.

Moreover, most engineers have been obsessed with the idea that the efficiency of a muffler, as to the deadening of noises, depends to a great extent upon the number of changes in direction of flow of gases passing through it; and that the greater the number of changes, the more effective the muffler becomes. They have recognized the fact that care must be taken that an undue back pressure is not created by the muffler, but they have lost sight of the fact that their very method of muffling noises by changing the direction of flow of gases and/or by passing the same through a large number of small openings can result only in frictional resistance, the summation of which equals the back pressure created by the muffler.

Also, these prior methods of confining gases within a muffler necessarily result, because of the frictional resistance built up, in a confinement of the same for so long a period, as to cause excessive back pressures which seriously affect the power output, and economy of operation of the motor; and likewise causes carbon formation in the cylinders, sticky valves, and improper cooling of the motor. Moreover, the back pressure prevents the products of combustion from being promptly removed from the engine cylinders through their exhaust valves, immediately upon the opening thereof, to make room for new mixtures to be introduced into the cylinders through their intake valves.

In other words, the cost of operation and maintenance of the average motor vehicle is much higher than it should be, because present types of mufflers prevent prompt scavenging of waste gases from the engine cylinders with a consequent injury to the various constituent elements of the internal combustion engine and an impairment of operation thereof.

The problem of solving these difficulties becomes more complex with the adoption of internal combustion engines having an increasingly larger number of cylinders, and having higher engine speeds, with a consequent increase in volume of exhaust gases which are required to be cleared, expanded, cooled, and noiselessly passed out through the exhaust system into the atmosphere.

These complex problems cannot be solved by use of the present muffler constructions in which the exhaust gases are required to pass through small perforations, and in which the exhaust gases are subjected to abrupt changes in direction, because these operations necessarily result in back pressure which prevents a full intake of fresh mixture to the motor cylinders, causing overheating of the engine because of the retention of hot, spent or burned gases therein.

Moreover, where small perforations are utilized in muffler construction, the same through constant use, finally become clogged by the deposit of fine particles of matter entrained in the exhaust gases passing therethrough.

It is therefore an object of the present invention to provide an exhaust system for internal combustion engines through which the exhaust gases are allowed a free and unobstructed passage to the outside atmosphere by being permitted to flow in an uninterrupted manner always in forward direction.

It is a further object of the present invention to provide an exhaust system for internal combustion engines, which operates to pull, draw or exhaust the burned, spent or dead gases from the cylinders and exhaust manifold. Thus, the present exhauster acts as a scavenger for the engine so that upon deceleration of the motor, with a consequent cutting off of pressure on the motor side of the exhaust system, the exhauster, per se, operates, by the action of the gases passing through the same, to draw the spent gases in the motor cylinders to the exhauster.

It is a further object of the present invention to utilize the principles of Venturi construction together with the principles of orifice construction for accomplishing the even and steady expansion of the exhaust gases in the exhauster, per se, in order to accomplish muffling by successive expansions during an uninterrupted flow in a forward direction of the exhaust gases, to obtain sufficient cooling of the exhaust gases through the exhauster walls at successive stages of expansion without undue confinement of the exhaust gases or interruption or restriction of its flow in a forward direction from inlet to outlet, and to utilize the vacuum created by the flow of the gases through one or more properly designed converging orifices to scavenge exhaust gases from the exhaust side of the engine.

And finally, it is an object of the present invention to provide an improved exhauster construction whose design is extremely simple, which has great strength and rigidity, which is practically incapable of being blown out by back-firing, which has a very low cost of construction, and which in operation creates only a negligible back pressure.

These and other objects may be obtained by providing an exhauster construction, preferred embodiments of which are hereinafter shown and described in detail, which may be stated in general terms as including a shell having inlet and outlet heads preferably welded thereto and adapted for connection preferably by means of suitable necks and clamps in the exhaust duct system of an internal combustion engine, and baffles preferably welded within and to the shell in spaced relation, dividing the interior of the shell into a series of compartments, preferably having successively decreasing volumes from the inlet end to the outlet end thereof, the baffles each preferably including curved walls converging from the shell wall toward the outlet head terminating in an orifice and being preferably identical in shape with their orifice openings preferably axially aligned with each other and with the inlet and outlet head openings.

In the drawings, Figure 1 is a longitudinal section through a preferred embodiment of the improved exhauster construction;

Fig. 2 is a longitudinal section of a slightly modified form of improved exhauster construction;

Fig. 3 is a view similar to Fig. 1, of another modified form of improved exhauster construction in which the converging orifice baffles are provided with converging sub-orifices;

Fig. 4 is a section taken on the line 4—4, Fig. 3;

Fig. 5 is a view similar to Fig. 3 of a still further modified form of improved exhauster construction in which the converging orifice baffles are provided with auxiliary orifices;

Fig. 6 is a section taken on the line 6—6, Fig. 5;

Fig. 7 is a view similar to Fig. 1 of another modified form of improved exhauster construction in which the exhauster shell is corrugated;

Fig. 8 is a section taken on the line 8—8, Fig. 7;

Fig. 9 is a view similar to Fig. 1 showing a modified form of converging orifice baffle;

Figs. 10 to 15, inclusive, are sectional views of still further modified forms of converging orifice baffles;

Fig. 16 is a diagrammatic view showing the constructional details of the preferred form of converging orifice baffle; and Fig. 17 is a section taken on the line 17—17, Fig. 1.

Similar numerals refer to similar parts throughout the drawings.

The shell of the exhauster includes a preferably cylindrical peripheral wall 18, an inlet head 19, and an outlet head 20 all formed of sheet metal of the desired gauge. The shell walls form an exhauster chamber having sufficient length and cross sectional area to satisfy the capacity requirements of the internal combustion engines which the exhauster serves. In forming the peripheral wall 18, the free edges of the sheet metal blank may preferably be butt-welded together at 21 (Fig. 17), or a lock seam 21', spot-welded at intervals, may be provided as shown in the modified form of the invention indicated in Fig. 8.

Each inlet and outlet head, 19 and 20, is preferably of standard muffler head design and includes an outer flange 22, and a curved body portion 23 provided with an opening 24 therethrough. The flanges 22 are preferably secured or fastened to the end portions of the shell wall 18 as by welding.

The head 19 is preferably equipped with a tubular inlet neck 25, flared at 26, to match the curved body portion 23 of the head, the portions 23 and 26 preferably being welded together. The exhaust pipe 27 communicating with the exhaust manifold of the internal combustion engine has its end portion inserted in the tubular neck 25, and the neck and pipe are connected together by any suitable means, as by the clamp 28 surrounding the end portion of the neck 25, which is preferably slotted at 29 to accommodate itself to the pipe 27 and clamp 28.

A tubular neck 30 is secured at its flared portion 31 to the curved wall 23 of the outlet head 20 as by welding, and the tail pipe 32 is received within the neck 30 and preferably clamped thereto by a clamp 33 surrounding the slotted end 34 of the neck 30.

Preferably a plurality of baffles 35, 35a and 35b having curved walls converging from the shell wall toward the chamber outlet and terminating in an orifice are located within the exhauster chamber in axial alignment and are secured to the peripheral wall 18 thereof by welding their outer flanges 36 to the wall 18. The baffle plates 35 accordingly divide the exhauster chamber into a plurality of compartments A, B, C and D, in series, the number of baffle walls, and the resulting number of compartments being contingent upon the size and type of internal combustion engine served.

Moreover, the relative spacing of the converging orifice baffles 35, from each other and from the inlet and outlet heads 19 and 20, is contingent upon the size of the exhauster as determined by the piston displacement, number of cylinders, and other characteristics of the internal combustion engine with which the exhauster communicates.

The general design of what is termed herein a "converging orifice", is particularly important and consists of a converging portion 37, preferably curved, terminating preferably in a short cylindric portion 38 forming an orifice 39, communicating between adjacent compartments A—B, B—C and C—D.

The proper design of the curved walls of the converging orifice baffles 35, which are each the same, is essential, there being a particular relationship between the various dimensional characteristics thereof which are indicated diagrammatically in Fig. 16. The volume of the compartment A is not only dependent upon its length, but upon its diameter X (Fig. 16), which is equal to three times the diameter of the orifice 39, indicated at Y. Thus the area of the orifice 39 equals one-ninth of the volume of the compartment A divided by its length. The radius of curvature R, of the converging portion 37, and the length L of the converging portion 37 may be equal to Y; while the length of the cylindric portion 38 may be equal to one-sixth Y, so that the over all length Z of the converging orifice equals seven-sixths Y.

The above stated dimensional characteristics of the converging orifice baffles 35 have been found to be most satisfactory in a number of installations, but it must be understood that the invention is not limited to baffles having the stated dimensional characteristics, because these characteristics may vary in accordance with the characteristics of the particular engine to which the exhauster is connected.

Thus, it is seen that the volumes of the compartments A, B, C, D successively decrease and have a predetermined relation with respect to one another, that the area of the baffle orifices has a predetermined functional relation with respect to the volume of one of the compartments, and that the curvature of the converging portion of the baffles has a predetermined functional relation with respect to the volume of one of the compartments.

The operation of the exhauster for muffling and scavenging exhaust gases from an internal combustion engine to which it is connected is somewhat as follows when the engine is operated:—

Considering at any instant a quantity of exhaust gases under pressure, having a relatively high temperature, and moving at a relatively high velocity when it reaches the end of the exhaust pipe 27, the same flows into compartment A which is originally at atmospheric pressure. A portion of the gases expand outwardly toward the shell wall 18 substantially at right angles to the direction of flow of the gases and continue to flow forwardly toward the baffle 35. The gases adjacent the shell 18 are cooled by contact therewith and in turn partially cool all of the gases in compartment A so that the effective volume of the gases is reduced.

Meanwhile, the pressure within compartment A is increased above atmospheric, while the pressure in compartment B is substantially atmospheric, so that the gases in flowing through compartment A reach the baffle 35, follow the converging portion 37 and flow with increased velocity through the orifice 39 into compartment B, aided by the direct flow of the central strata of gases into compartment B.

The same action now takes place in compartment B wherein the gases expand and are cooled by contact with the wall 18. The gases entering compartment B are not obstructed in passage, but are free to expand and flow therethrough without restriction. The pressure in compartment B is raised somewhat above atmospheric, while the pressure in compartment C is still at atmospheric so that the gases again flow from compartment B to C in a similar manner, and then from compartment C to compartment D in a like manner, finally passing out through the tail pipe 32 into the atmosphere in a steady stream in which the pressure and velocity energy of the gases has been reduced substantially to atmospheric.

Meanwhile, succeeding quantities of exhaust gases enter, expand in, are cooled in, contract and pass through the successive compartments A, B, C and D of the exhauster in continuity. The successive expansions of the exhaust gases are accordingly carried out in stages because the mean pressure existing at any one time in any one compartment A, B, C or D or the atmosphere is always less than the mean pressure existing in the next preceding compartment or exhaust pipe 27.

Moreover, the flow of gases through the converging orifice baffles 35, 35a and 35b, the orifices of which each have the same area, causes the creation of a vacuum indicated at V surrounding and adjacent the right hand side of the baffles, which vacuum assists the constant uninterrupted flow in a forward direction of exhaust gases through the exhauster. Moreover, if for some reason the motor is suddenly decelerated or stopped so as to relieve the pressure head in the exhaust pipe 27, the vacuum V existing in the compartments B, C and D adjacent the baffles 35, 35a and 35b acts to scavenge the dead gases from the engine exhaust duct and draw the same out through the exhauster.

The exhauster shown in Fig. 2 is identical with that shown in Fig. 1 excepting only that the inlet and outlet heads 35c and 35d thereof have the same shape as the converging orifice baffles 35, 35a and 35b so as to facilitate production of the same and reduce plant investment in dies, etc.

Certain types of exhausters for internal combustion engines may be required to relieve a building up of too great a pressure in compartments A, B and C in the zone adjacent their outer wall 18 and converging orifice baffles. This may be accomplished by providing a series of small converging sub-orifices 135 adjacent the periphery of each enlarged central converging orifice baffle 35, as shown in Figs. 3 and 4. The converging sub-orifices 135 have the same contour and construction as the main central converging orifice 37—39 and accordingly function in the same manner as the converging orifice 37—39.

When it may be desirable to accomplish the same results that are accomplished by the construction shown in Fig. 3, but in a slightly less efficient manner, the same may be accomplished by the modified construction shown in Figs. 5 and 6 in which a plurality of auxiliary orifices 235 are provided in each converging orifice baffle 35 adjacent the periphery thereof, which function slightly less efficient than, but in the same manner as the converging sub-orifices 135.

Another manner in which too high a pressure can be prevented from being built up in compartments A, B and C under extreme conditions is by corrugating the peripheral shell wall of the exhauster as shown at 18a in Figs. 7 and 8, thus providing additional cooling area for each expansion compartment and providing auxiliary orifices 335 communicating between compartments A and B, B and C, and C and D.

In Figs. 9 and 10 a modified form of converging orifice baffle is shown at 40 in which the converging orifice 41 thereof is smaller than the preferred form of converging orifice previously described, but which is also provided with a plurality of sub-orifices 41'.

Figs. 11, 12, 13, 14 and 15 show other modified forms of converging orifice baffles 42, 43, 44, 45 and 46, respectively. The converging orifice baffles 42 and 46 are shown as being provided with converging sub-orifices 47 and 48 respectively.

The converging orifice baffle 45 illustrates the manner in which the outer peripheral flange thereof may extend in a direction opposite the direction in which the converging orifice thereof extends.

The outer flange of the baffle 46 is shown as being corrugated for use in connection with an exhauster having a corrugated shell for increasing the cooling effect thereof without passing the exhaust gases around the outer periphery of the baffle between adjacent compartments.

In the exhausters shown, the orifices communicating between compartments are materially larger in cross sectional area than the minute perforations required in present day mufflers, with the result that high velocities and pressures in the improved exhauster are non-existent and fluid flow frictional losses and a building up of pressure which would create a back pressure are negligible.

Moreover, the relatively large orifices give a balance flow of exhaust gases through the exhauster and aid in producing the vacuum V. Also, the curvature of the walls of the baffles is arranged to slow up the flow of gases through the exhauster only sufficiently to permit the proper amount of cooling and consequent effective volume reduction of exhaust gases to occur in each compartment.

Accordingly, the hot exhaust gases are entirely free to gradually expand and cool in stages in successive compartments, while the gases flow forwardly in one direction between and through expansion stages, and finally pass out through the tail pipe into the atmosphere at a reduced temperature and pressure in a smooth unbroken stream.

Moreover, the vacuum V by the flow between successive stages, maintains the flow between stages and causes scavenging of the hot exhaust gases away from the engine exhaust valves, and out of the cylinders so that no burned or inert gases mingle with the fresh mixture introduced therein.

It has been found by a series of tests carried out on present day designs of motor vehicles, comparative between the improved exhauster and present day designs of mufflers, that the improved exhauster aids in starting motor vehicles, permits quicker acceleration thereof, increases the power available from existing engines, does not create disturbance upon instant deceleration, reduces fuel consumption, lowers the upkeep cost of internal combustion engines, maintains the internal areas of the engine cleaner, and lengthens the life of the engine.

Moreover, the back pressure created by the improved exhauster is negligible, while the exhauster, per se, is extremely simple in design, has great strength and rigidity, is practically incapable of being blown out by back-firing, and has a very low cost of construction.

I claim:—

1. An internal combustion engine exhauster including shell walls forming a chamber, a plurality of baffles therein dividing the chamber into a plurality of compartments in series, each baffle having an enlarged central converging orifice and a plurality of converging sub-orifices in the baffles and surrounding the central orifice, all communicating between adjacent compartments, whereby exhaust gases under pressure flow uninterruptedly in a forward direction through the exhauster and expand in successive compartments.

2. An internal combustion engine exhauster including shell walls forming a chamber, a plurality of baffles therein dividing the chamber into a plurality of compartments in series, each baffle having an enlarged central converging orifice and a plurality of converging sub-orifices in the baffles and surrounding the central orifice, all communicating between adjacent compartments, said sub-orifices being identical with the central orifices in contour, the central orifices each having the same area, whereby exhaust gases under pressure flow uninterruptedly in a forward direction through the exhauster and expand in successive compartments.

GEORGE H. MORGENSTERN.